(12) United States Patent
Comaniciu et al.

(10) Patent No.: US 6,590,999 B1
(45) Date of Patent: Jul. 8, 2003

(54) REAL-TIME TRACKING OF NON-RIGID OBJECTS USING MEAN SHIFT

(75) Inventors: Dorin Comaniciu, Piscataway, NJ (US); Visvanathan Ramesh, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/503,991

(22) Filed: Feb. 14, 2000

(51) Int. Cl.[7] ................................................. G06K 9/00
(52) U.S. Cl. ....................... 382/103; 382/107; 382/190; 348/416.1
(58) Field of Search ................................ 382/103, 107, 382/190; 348/416.1, 169

(56) References Cited

U.S. PATENT DOCUMENTS 4,868,871 A * 9/1989 Watson, III ................. 382/103
5,946,041 A * 8/1999 Morita ..................... 348/416.1
6,169,817 B1 * 1/2001 Parker et al. ................ 382/131

OTHER PUBLICATIONS

"The Divergence and Bhattacharyya Distance Measures in Signal Selection" by Thomas Kailath, IEEE Transactions on Communication Technology, Feb. 1967, pp. 52–60.*

* cited by examiner

*Primary Examiner*—Jon Chang
*Assistant Examiner*—Charles Kim
(74) *Attorney, Agent, or Firm*—Donald B. Paschburg

(57) ABSTRACT

A method and apparatus for real-time tracking of a non-rigid target. The tracking is based on visual features, such as color and/or texture, where statistical distributions of those features characterize the target. A degree of similarity ($\rho(y_0)$) is computed between a given target (at $y_0$) in a first frame and a candidate target (at $y_1$) in a successive frame, the degree being expressed by a metric derived from the Bhattacharyya coefficient. A gradient vector corresponding to a maximization of the Bhattacharyya coefficient is used to derive the most probable location of the candidate target in the successive frame.

33 Claims, 6 Drawing Sheets

○ INITIAL LOCATION
▽ CONVERGANCE POINT

REAL-TIME TRACKING OF NON-RIGID OBJECTS USING MEAN SHIFT

FIELD OF THE INVENTION

The present invention relates to a method and apparatus for real-time tracking of non-rigid objects appearing as an image in successive image frames. A degree of similarity is computed between a given target in a first frame and a candidate target in a successive frame, in the preferred embodiment the degree being expressed by a metric derived from the Bhattacharyya coefficient. A gradient vector corresponding to a maximization of the Bhattacharyya coefficient is used to derive the most probable location of the candidate target in the successive frame. The invention provides a practical, fast and efficient solution which achieves real-time performance (30 frames/sec.), and is appropriate for tracking a large variety of targets. The invention provides tracking which is robust to partial occlusion, significant clutter, target scale variations, rotations in depth, and changes in camera position (zoom, tilt and pan).

DESCRIPTION OF THE PRIOR ART

The efficient tracking of visual features in complex environments, such as where the camera itself is moving (and thus both the foreground and background images change with each frame), is a challenging task for the vision community. Real-time applications such as surveillance and monitoring, perceptual user interfaces, smart rooms, and video compression all require the ability to track moving objects. The computational complexity of the tracker is critical for most applications, since only a small percentage of a system's resources are typically allocated for tracking, while the rest of the resources are assigned to preprocessing stages or to higher-level tasks such as recognition, trajectory interpretation, and reasoning.

SUMMARY OF THE INVENTION

The present invention describes a new approach for real-time tracking of a non-rigid target. The tracking is based on visual features, such as color and/or texture, where statistical distributions of those features characterize the target. A degree of similarity is computed between a given target in a first frame and a candidate target in a successive frame, the degree being expressed by a metric derived from the Bhattacharyya coefficient. A gradient vector corresponding to a maximization of the Bhattacharyya coefficient is used to derive the most probable location of the candidate target in the successive frame.

More specifically, the method and apparatus in accordance with the present invention for real-time tracking of a target which appears in a plurality of successive image frames, comprises:
 a) Developing a statistical distribution as a characterization of a visual feature of each of a given target in a first frame and a candidate target in a successive frame,
 b) Computing a degree of similarity between the given target and the candidate target, the degree being expressed by a metric derived from the Bhattacharyya coefficient, and
 c) Applying an iterative comparative procedure to the degrees of similarity computed in step b), the iterations being based on a gradient vector corresponding to a maximization of the Bhattacharyya coefficient in order to shift the location of candidate target in the successive frame, to derive as the location of the candidate target in the successive frame that location which has characteristics most similar to the characteristics of the given target in the first frame.

DETAILED DESCRIPTION OF A PREFERRED EMBODIMENT OF THE INVENTION

Figure 1:
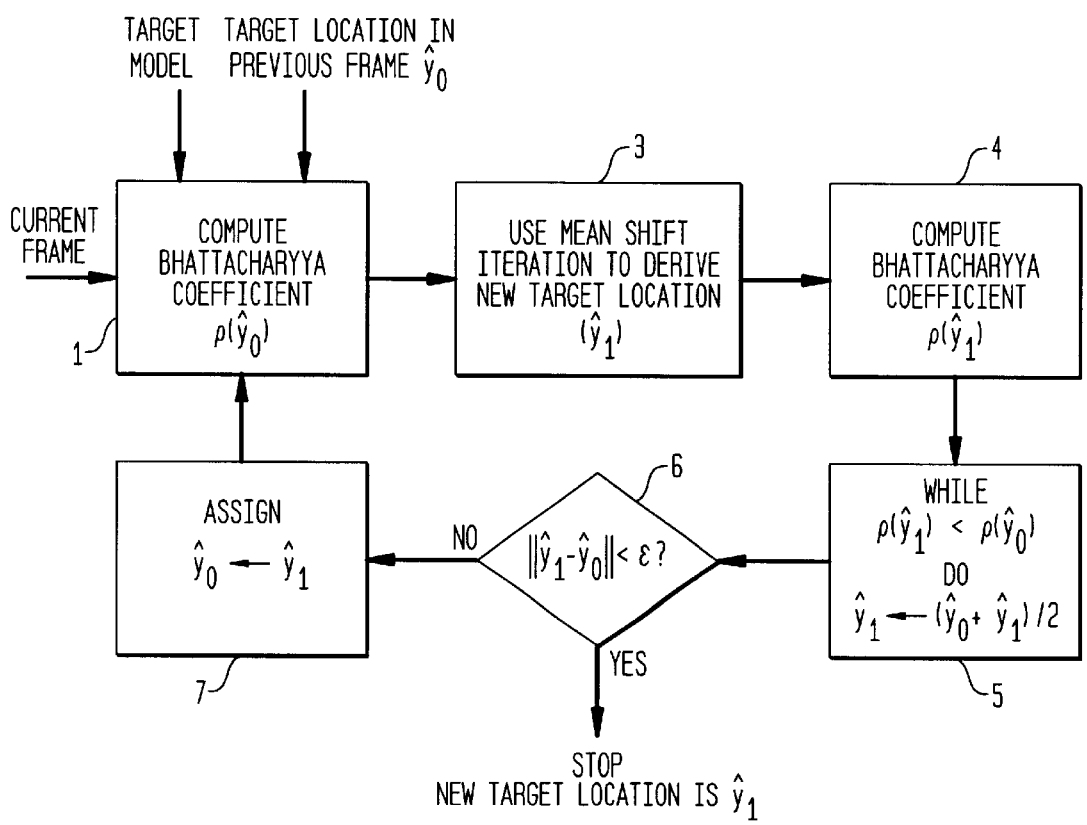
FIG. 1 illustrates in block diagram form the tracking technique of the present invention.

The description is organized as follows.

Section 1 presents and extends the mean shift property for use to find the location of a candidate target, Section 2 introduces a similarity metric derived from the Bhattacharyya coefficient, Section 3 develops and analyzes the tracking method of the invention, Section 4 provides the result of experiments and comparisons, and Section 5 provides discussion.

1. Mean Shift Analysis

Here we define the sample mean shift, introduce the iterative mean shift procedure, and present a new theorem showing the convergence for kernels with convex and monotonic profiles.

Sample Mean Shift

Given a set $\{x_i\}_{i=1 \ldots n}$ of n points in the d-dimensional space $R^d$, the multivariate kernel density estimate with kernel K(x) and window radius (bandwidth) h, computed in the point x is given by $$\hat{f}(x) = \frac{1}{nh^d} \sum_{i=1}^{n} K\left(\frac{x - x_i}{h}\right) \quad (1)$$

The minimization of the average global error between the estimate and the true density yields the multivariate Epanechnikov kernel (described at page 139 of D. W. Scott, Multivariate Density Estimation, New York: Wiley, 1992).

$$K_E(x) = \begin{cases} \frac{1}{2}c_d^{-1}(d+2)(1-\|x\|^2) & \text{if } \|x\| < 1 \\ 0 & \text{otherwise} \end{cases} \quad (2)$$

where $C_d$ is the volume of the unit d-dimensional sphere. Another commonly used kernel is the multivariate normal $$K_N(x) = (2\pi)^{-d/2}\exp\left(-\frac{1}{2}\|x\|^2\right) \quad (3)$$

Let us introduce the profile of a kernel K as a function k: $[0,\infty) \to R$ such that $K(x) = k(\|x\|^2)$. For example, according to (2) the Epanechnikov profile is $$k_E(x) = \begin{cases} \frac{1}{2}c_d^{-1}(d+2)(1-x) & \text{if } x < 1 \\ 0 & \text{otherwise} \end{cases} \quad (4)$$

and from (3) the normal profile is given by $$k_N(x) = (2\pi)^{-d/2}\exp\left(-\frac{1}{2}x\right) \quad (5)$$

Employing the profile notation we can write the density estimate (1) as $$\hat{f}_K(x) = \frac{1}{nh^d}\sum_{i=1}^{n} k\left(\left\|\frac{x-x_i}{h}\right\|^2\right) \quad (6)$$

We denote $$g(x) = -k'(x), \quad (7)$$

assuming that the derivative of k exists for all $x \in [0,\infty)$, except for a finite set of points. A kernel G can be defined as $$G(x) = Cg(\|x\|^2), \quad (8)$$

where C is a normalization constant. Then, by taking the estimate of the density gradient as the gradient of the density estimate we have $$\hat{\nabla} f_K(x) \equiv \nabla \hat{f}_K(x) = \frac{2}{nh^{d+2}}\sum_{i=1}^{n}(x-x_i)k'\left(\left\|\frac{x-x_i}{h}\right\|^2\right) \quad (9)$$

$$= \frac{2}{nh^{d+2}}\sum_{i=1}^{n}(x_i-x)g\left(\left\|\frac{x-x_i}{h}\right\|^2\right) = \frac{2}{nh^{d+2}} *$$

$$* \left[\sum_{i=1}^{n}g\left(\left\|\frac{x-x_i}{h}\right\|^2\right)\right]\left[\frac{\sum_{i=1}^{n}x_i g\left(\left\|\frac{x-x_i}{h}\right\|^2\right)}{\sum_{i=1}^{n}g\left(\left\|\frac{x-x_i}{h}\right\|^2\right)} - x\right]$$

where $$\sum_{i=1}^{n}g\left(\left\|\frac{x-x_i}{h}\right\|^2\right)$$

can be assumed to be nonzero. Note that the derivative of the Epanechnikov profile is the uniform profile, while the derivative of the normal profile remains a normal.

The last bracket in (9) contains the sample mean shift vector $$M_{h,G}(x) \equiv \frac{\sum_{i=1}^{n}x_i g\left(\left\|\frac{x-x_i}{h}\right\|^2\right)}{\sum_{i=1}^{n}g\left(\left\|\frac{x-x_i}{h}\right\|^2\right)} - x \quad (10)$$

and the density estimate at x $$\hat{f}_G(x) \equiv \frac{C}{nh^d}\sum_{i=1}^{n}g\left(\left\|\frac{x-x_i}{h}\right\|^2\right) \quad (11)$$

computed with kernel G. Using now (10) and (11), (9) becomes $$\hat{\nabla} f_K(x) = \hat{f}_G(x)\frac{2/C}{h^2}M_{h,G}(x) \quad (12)$$

from where it follows that $$M_{h,g}(x) = \frac{h^2}{2/C}\frac{\hat{\nabla} f_K(x)}{\hat{f}_G(x)} \quad (13)$$

Expression (13) shows that the sample mean shift vector obtained with kernel G is an estimate of the normalized density gradient obtained with kernel K.

A Sufficient Convergence Condition

The mean shift procedure is defined recursively by computing the mean shift vector $M_{h,G}(x)$ and translating the center of kernel G by $M_{h,G}(x)$.

Let us denote by $\{y_j\}_{j=1,2,...}$ the sequence of successive locations of the kernel G, where $$y_{j+1} = \frac{\sum_{i=1}^{n}x_i g\left(\left\|\frac{y_j-x_i}{h}\right\|^2\right)}{\sum_{i=1}^{n}g\left(\left\|\frac{y_j-x_i}{h}\right\|^2\right)}, \quad j=1,2,... \quad (14)$$

is the weighted mean at $y_j$ computed with kernel G and $y_1$ is the center of the initial kernel. The density estimates computed with kernel K in the points (14) are $$\hat{f}_K = \{\hat{f}_K(j)\}_{j=1,2,...} \equiv \{\hat{f}_K(y_j)\}_{j=1,2,...} \quad (15)$$

These densities are only implicitly defined to obtain $\nabla f_K$. However we need them to prove the convergence of the sequences (14) and (15).

Theorem 1 If the kernel K has a convex and monotonic decreasing profile and the kernel G is defined according to (7) and (8), the sequences (14) and (15) are convergent. The Theorem 1 generalizes the convergence shown in D. Comaniciu, P. Meer, "Mean Shift Analysis and Applications," IEEE Int'l Conf. Computer. Vision, Kerkyra, Greece, 1197–1203, 1999, where K was the Epanechnikov kernel, and G the uniform kernel. Note that Theorem 1 is also valid when we associate to each data point $x_i$ a positive weight $w_i$.

2. Bhattacharyya Coefficient Based Metric for Target Localization

The task of finding the target location in the current frame is formulated as follows. The feature z representing the color and/or texture of the target model is assumed to have a density function $q_z$, while the target candidate centered at location y has the feature distributed according to $p_z(y)$.

The problem is then to find the discrete location y whose associated density $p_z(y)$ is the most similar to the target density $q_z$.

To define the similarity measure we take into account that the probability of classification error in statistical hypothesis testing is directly related to the similarity of the two distributions. The larger the probability of error, the more similar the distributions. Therefore, (contrary to the hypothesis testing), we formulate the target location estimation problem as the derivation of the estimate that maximizes the Bayes error associated with the model and candidate distributions. For the moment, we assume that the target has equal prior probability to be present at any location y in the neighborhood of the previously estimated location. An entity closely related to the Bayes error is the Bhattacharyya coefficient, whose general form is defined by [19]

$$\rho(y) = \rho[p(y), q] = \int \sqrt{p_z(y) q_z} \, dz \tag{16}$$

Properties of the Bhattacharyya coefficient such as its relation to the Fisher measure of information, quality of the sample estimate, and explicit forms for various distributions are given in A. Djouadi, O. Snorrason, F. D. Garber, "The Quality of Training-Sample Estimates of the Bhattacharyya Coefficient," IEEE Trans. Pattern Analysis Machine Intell., 12:92–97, 1990, and in T. Kailath, "The Divergence and Bhattacharyya Distance Measures in Signal Selection," IEEE Trans. Commun. Tech., COM-15:52–60, 1967.

Our interest in expression (16) is, however, motivated by its near optimality given by the relationship to the Bayes error. Indeed, let us denote by $\alpha$ and $\beta$ two sets of parameters for the distributions p and q and by $\pi = (\pi_p, \pi_q)$ a set of prior probabilities. If the value of (16) is smaller for the set $\alpha$ than for the set $\beta$, it can be proved that, there exists a set of priors $\pi^*$ for which the error probability for the set is $\alpha$ less than the error probability for the set $\beta$. In addition, starting from (16) upper and lower error bounds can be derived for the probability of error.

The derivation of the Bhattacharyya coefficient from sample data involves the estimation of the densities p and q, for which we employ the histogram formulation. Although not the best nonparametric density estimate, the histogram satisfies the low computational cost imposed by real-time processing. We estimate the discrete density $\hat{q} = \{\hat{q}_u\}_{u=1\ldots m}$ (with $\Sigma_{u=1}^m \hat{q}_u = 1$) from the m-bin histogram of the target model, while $p(\hat{y}) = \{\hat{p}_u(y)\}_{u=1\ldots m}$ (with $\Sigma_{u=1}^m \hat{p}_u = 1$) is estimated at a given location y from the m-bin histogram of the target candidate. Hence, the sample estimate of the Bhattacharyya coefficient is given by $$\hat{\rho}(y) \equiv \rho[\hat{p}(y), \hat{q}] = \sum_{u=1}^m \sqrt{\hat{p}_u(y) \hat{q}_u} . \tag{17}$$

The geometric interpretation of (17) is the cosine of the angle between the m-dimensional, unit vectors $$(\sqrt{\hat{p}_1}, \ldots, \sqrt{\hat{p}_m})^T \text{ and } (\sqrt{\hat{q}_1}, \ldots, \sqrt{\hat{q}_m})^T$$

Using now (17) the distance between two distributions can be defined as $$d(y) = \sqrt{1 - \rho[\hat{p}(y), \hat{q}]} \tag{18}$$

The statistical measure (18) is well suited for the task of target localization since:

1. It is nearly optimal, due to its link to the Bayes error. Note that the widely used histogram intersection technique has no such theoretical foundation.
2. It imposes a metric structure (see Appendix). The Bhattacharyya distance (as described by K. Fukunaga, at page 99 of Introduction to Statistical Pattern Recognition, Second Ed., Academic Press, Boston, 1990) or Kullback divergence (described at page 18 of T. M. Cover and J. A. Thomas, Elements of Information Theory, John Wiley & Sons, New York, 1991) are not metrics since they violate at least one of the distance axioms.
3. Using discrete densities, (18) is invariant to the scale of the target (up to quantization effects). Histogram intersection is scale variant.
4. Being valid for arbitrary distributions, the distance (18) is superior to the Fisher linear discriminant, which yields useful results only for distributions that are separated by the mean-difference.

The next section shows how to minimize (18) as a function of y in the neighborhood of a given location, by exploiting the mean shift iterations. Only the distribution of the object colors will be considered, although the texture distribution can be integrated into the same framework.

3. Tracking Algorithm

We assume in the sequel the support of two modules which should provide (a) detection and localization in the initial frame of the objects to track (targets), and (b) periodic analysis of each object to account for possible updates of the target models due to significant changes in color.

Color Representation

Target Model Let $\{x^*_i\}_{i=1\ldots n}$ be the pixel locations of the target model, centered at 0. We define a function b : $R^2 \to \{1 \ldots m\}$ which associates to the pixel at location $x^*_i$ the index $b(x^*_i)$ of the histogram bin corresponding to the color of that pixel. The probability of the color u in the target model is derived by employing a convex and monotonic decreasing kernel profile k which assigns a smaller weight to the locations that are farther from the center of the target. The weighting increases the robustness of the estimation, since the peripheral pixels are the least reliable, being often affected by occlusions (clutter) or background. The radius of the kernel profile is taken equal to one, by assuming that the generic coordinates x and y are normalized with $h_x$ and $h_y$, respectively. Hence, we can write $$\hat{q}_u = C \sum_{i=1}^n k(\|x^*_i\|^2) \delta[b(x^*_i) - u] \tag{19}$$

where $\delta$ is the Kronecker delta function. The normalization constant C is derived by imposing the condition $\Sigma_{u=1}^m \hat{q}_u = 1$, from where $$C = \frac{1}{\sum_{i=1}^n k(\|x^*_i\|^2)} \tag{20}$$

since the summation of delta functions for $u = 1 \ldots m$ is equal to one.

Target Candidates Let $\{x_i\} I = 1 \ldots nh$ be the pixel locations of the target candidate, centered at y in the current frame. Using the same kernel profile k, but with radius h, the probability of the color u in the target candidate is given by $$\hat{p}_u(y) = C_h \sum_{i=1}^{n_h} k\left(\left\|\frac{y-x_i}{h}\right\|^2\right)\delta[b(x_i)-u] \quad (21)$$

where $C_h$ is the normalization constant. The radius of the kernel profile determines the number of pixels (i.e., the scale) of the target candidate. By imposing the condition that $\Sigma_{u=1}^{m}\hat{p}_u=1$ we obtain $$C_h = \frac{1}{\sum_{i=1}^{n_h} k\left(\left\|\frac{y-x_i}{h}\right\|^2\right)} \quad (22)$$

Note that $C_h$ does not depend on y, since the pixel locations $x_i$ are organized in a regular lattice, y being one of the lattice nodes. Therefore, $C_h$ can be precalculated for a given kernel and different values of h.

Distance Minimization

According to Section 3, the most probable location y of the target in the current frame is obtained by minimizing the distance (18), which is equivalent to maximizing the Bhattacharyya coefficient $\hat{\rho}(y)$. The search for the new target location in the current frame starts at the estimated location $\hat{y}_0$ of the target in the previous frame. Thus, the color probabilities $\{\hat{p}_u(\hat{y}_0)\}_{u=1\ldots m}$ of the target candidate at location $\hat{y}_0$ in the current frame have to be computed first. Using Taylor expansion around the values $\hat{p}_u(\hat{y}_0)$ the Bhattacharyya coefficient (17) is approximated as (after some manipulations)

$$\rho[\hat{p}(y),\hat{q}] \approx \frac{1}{2}\sum_{u=1}^{m}\sqrt{\hat{p}_u(\hat{y}_0)}\hat{q}_u + \frac{1}{2}\sum_{u=1}^{m}\hat{p}_u(y)\sqrt{\frac{\hat{q}_u}{\hat{p}_u(\hat{y}_o)}} \quad (23)$$

where it is assumed that the target candidate $\{\hat{p}_u(y)\}_{u=1\ldots m}$ does not change drastically from the initial $\{\hat{p}_u(\hat{y}_0)\}_{u=1\ldots m}$, and that $\hat{p}_u(\hat{y}_0)>0$ for all u=1 ... m. Introducing now (21) in (23) we obtain $$\rho[\hat{p}(y),\hat{q}] \approx \frac{1}{2}\sum_{u=1}^{m}\sqrt{\hat{p}_u(\hat{y}_0)}\hat{q}_u + \frac{C_h}{2}\sum_{u=1}^{n_h}\hat{w}_i k\left(\left\|\frac{y-x_i}{h}\right\|^2\right) \quad (24)$$

where $$w_i = \sum_{u=1}^{m}\delta[b(x_i)-u]\sqrt{\frac{\hat{q}_u}{\hat{p}_u(\hat{y}_o)}} \quad (25)$$

Thus, to minimize the distance (18), the second term in equation (24) has to be maximized, the first term being independent of y. The second term represents the density estimate computed with kernel profile k at y in the current frame, with the data being weighted by $w_i$ (25).

In accordance with the principles of the present invention, this maximization can be efficiently achieved based on the mean shift iterations, using the technique described below, and as shown in the block diagram of FIG. 1.

Bhattacharyya Coefficient $\rho[\hat{p}(y),\hat{q}]$ Maximization

Given the distribution $\{\hat{q}_u\}_{u=1\ldots m}$ of the target model and the estimated location $\hat{y}_0$ of the target in the previous frame:

1. Initialize the location of the target in the current frame with $\hat{y}_0$, compute the distribution $$\rho[\hat{p}(\hat{y}_0),\hat{q}] = \Sigma_{u=1}^{m}\sqrt{\hat{p}_u(\hat{y}_0)\hat{q}_u}$$

$\{\hat{p}_u(\hat{y}_0)\}_{u=1\ldots m,\text{ and evaluate}}$
This step is shown by box 1.
2. Derive the weights $\{w_i\}_{i=1\ldots n_h}$ according to (25). This step is not specifically shown in FIG. 1.
3. Based on the mean shift vector, derive a new location for the target (14)

$$\hat{y}_1 = \frac{\sum_{i=1}^{n_h} x_i w_i g\left(\left\|\frac{\hat{y}_0-x_i}{h}\right\|^2\right)}{\sum_{i=1}^{n_h} w_i g\left(\left\|\frac{\hat{y}_0-x_i}{h}\right\|^2\right)}$$

This step is shown by box 3.
4. Update $\{\hat{p}_u(\hat{y}_1)\}_{u=1\ldots m,\text{ and evaluate}}$ $$\rho[\hat{p}(\hat{y}_1),\hat{q}] = \Sigma_{u=1}^{m}\sqrt{\hat{p}_u(\hat{y}_1)\hat{q}_u}.$$

This step is shown by box 4.
5. While $\rho[\hat{p}(\hat{y}_1),\hat{q}] < \rho[\hat{p}(\hat{y}_0),\hat{q}]$ Do $\hat{y}_1 \leftarrow \frac{1}{2}(\hat{y}_0+\hat{y}_1)$.

This step is shown by box 5.
6. If $\|\hat{y}_1-\hat{y}_0\| < \epsilon$ Stop.
This step is shown by box 6.
7. Otherwise, set $\hat{y}_0 \leftarrow \hat{y}_1$ and go to back to Step 1.
This step is shown by box 7.

Thus, in accordance with the present invention, the optimization provided by the mean shift vector in Step 3 increases the value of the approximated Bhattacharyya coefficient $\rho(y)$. Since this operation does not necessarily increase the value of $\rho(y)$, the test included in Step 5 is needed to validate the new location of the target. However, practical experiments (tracking different objects, for long periods of time) showed that the Bhattacharyya coefficient computed at the location defined by equation (26) was almost always larger than the coefficient corresponding to $y_0$. Less than 0.1% of the performed maximizations yielded cases where the Step 5 iterations were necessary. In accordance with one aspect of the invention, the termination threshold $\epsilon$ used in Step 6 is derived by constraining the vectors representing $y_0$ and $y_1$ to be within the same pixel in the image coordinates.

The tracking consists in running for each frame the optimization technique described above. Thus, given the target model, the new location of the target in the current frame minimizes the distance (18) in the neighborhood of the previous location estimate.

Scale Adaptation

The scale adaptation scheme exploits the property of the distance (18) to be invariant to changes in the object scale. We simply modify the radius h of the kernel profile with a certain fraction (in an iterative manner we used ±10% and −10%), let the tracking algorithm to converge again, and choose the radius yielding the largest decrease in the distance (18). An IIR filter is used to derive the new radius based on the current measurements and old radius. Thus, a control signal derived from the new target locations can be used to control not only the pan and tilt movements of the camera, but can also control its zoom.

4. Experiments

Figure 2:
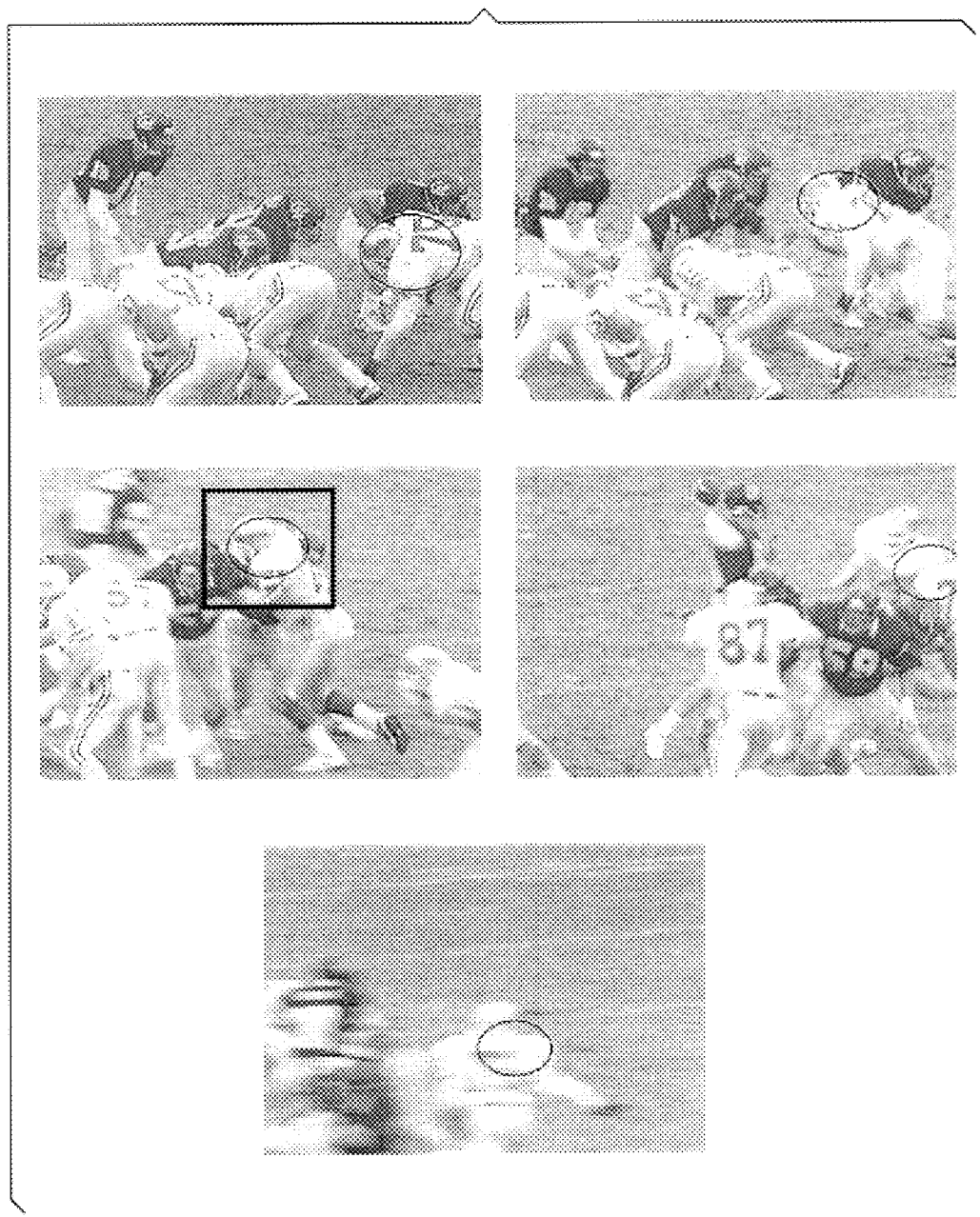
FIG. 2 illustrates application of the tracking provided by the present invention to the task of tracking a football player in a sequence of image frames.

The proposed method has been applied to the task of tracking a football player marked by a hand-drawn ellipsoidal region (first image of FIG. 2). The sequence has 154 frames of 352×240 pixels each and the initial normalization constants (determined from the size of the target model) were $(h_x, h_y)=71,53)$. Frames 30, 75, 105, 140 and 150 are shown in FIG. 2. The Epanechnikov profile (4) has been used for histogram computation, therefore, the mean shift iterations were computed with the uniform profile. The target histogram has been derived in the RGB space with 16×16×16 bins. The algorithm runs comfortably at 30 fps on a 600 MHz PC, Java implementation.

The tracking results are presented in sequence of frames shown in FIG. 2. The mean shift based tracker proved to be robust to partial occlusion, clutter, distractors (frame 140 in FIG. 2), and camera motion. Since no motion model has been assumed, the tracker adapted well to the nonstationary character of the player's movements, which alternates abruptly between slow and fast action. In addition, the intense blurring present in some frames and due to the camera motion, did not influence the tracker performance (frame 150 in FIG. 2). The same effect, however, can largely perturb contour based trackers.

Figure 3:
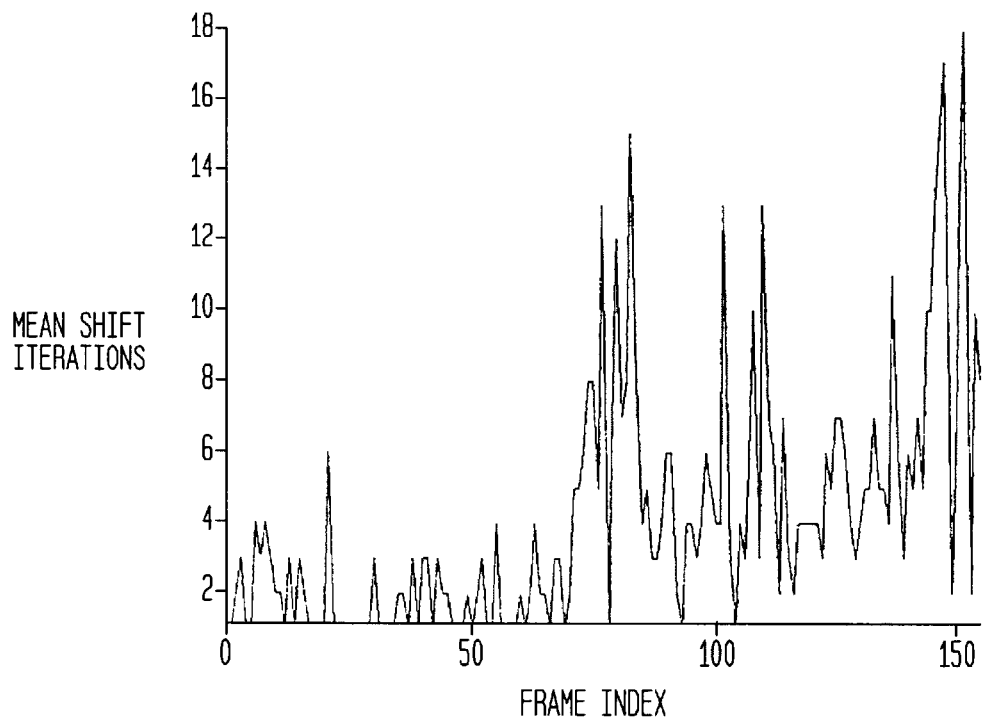
FIG. 3 illustrates the number of mean shift iterations per frame needed for tracking the football player in the sequence of image frames shown in FIG. 2.

The number of mean shift iterations necessary for each frame (one scale) in the Football sequence is shown in FIG. 3. One can identify two central peaks, corresponding to the movement of the player to the center of the image and back to the left side. The last and largest peak is due to the fast movement from the left to the right side.

Figure 4:
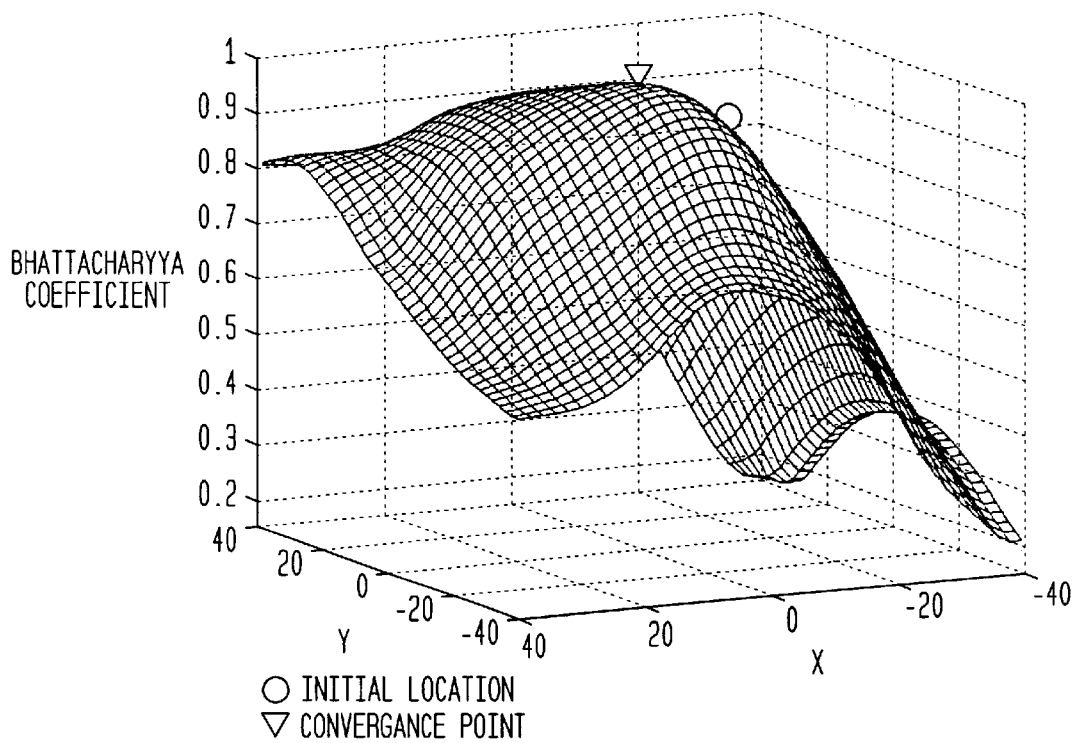
FIG. 4 illustrates the values of the Bhattacharyya coefficient for the region marked in the third frame shown in FIG. 2, FIGS. 5 and 6 illustrate application of the invention for tracking people on a subway platform.

To demonstrate the efficiency of approach taken by the present invention, FIG. 4 presents the surface obtained by computing the Bhattacharyya coefficient for the rectangle marked in FIG. 2, frame 105. The resulting surface is asymmetric, due to the player colors that are similar to the target. The target model (the selected elliptical region in frame 30) has been compared with the target candidates obtained by. sweeping the elliptical region in frame 105 inside the rectangle. While most of the tracking approaches based on regions must perform an exhaustive search in the rectangle to find the maximum, the present invention converged in four iterations as shown in FIG. 4. Note that since the basin of attraction of the mode covers the entire window, the correct location of the target would have been reached also from farther initial points. An optimized computation of the exhaustive.search of the mode has a much larger arithmetic complexity, dependent on the chosen search area.

Figure 5:
Figure 5:
Figure 5:
Figure 5:
Figure 5:
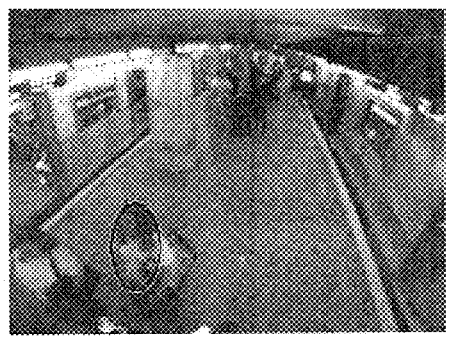

The present invention has been applied to track people on subway platforms. The camera being fixed, additional geometric constraints can be imposed to the tracking process. The following sequences, however, have been processed with the inventive method unchanged A first example is shown in FIG. 5, demonstrating the capability of the tracker to adapt to scale changes. The sequence has 187 frames of 352×240 pixels each and the initial normalization constants were $(h_x, h_y)=(23,27)$.

Figure 6:

FIG. 6 presents six frames (3140, 3516, 3697, 5440, 6081 and 6681, from left to right and top to bottom) from a 2 minute sequence showing the tracking of a person from the moment she enters the subway platform until she gets on the train (≈approx. 3600 frames). The tracking performance is remarkable, taking into account the low quality of the processed sequence, due to the compression artifacts.

Figure 7:
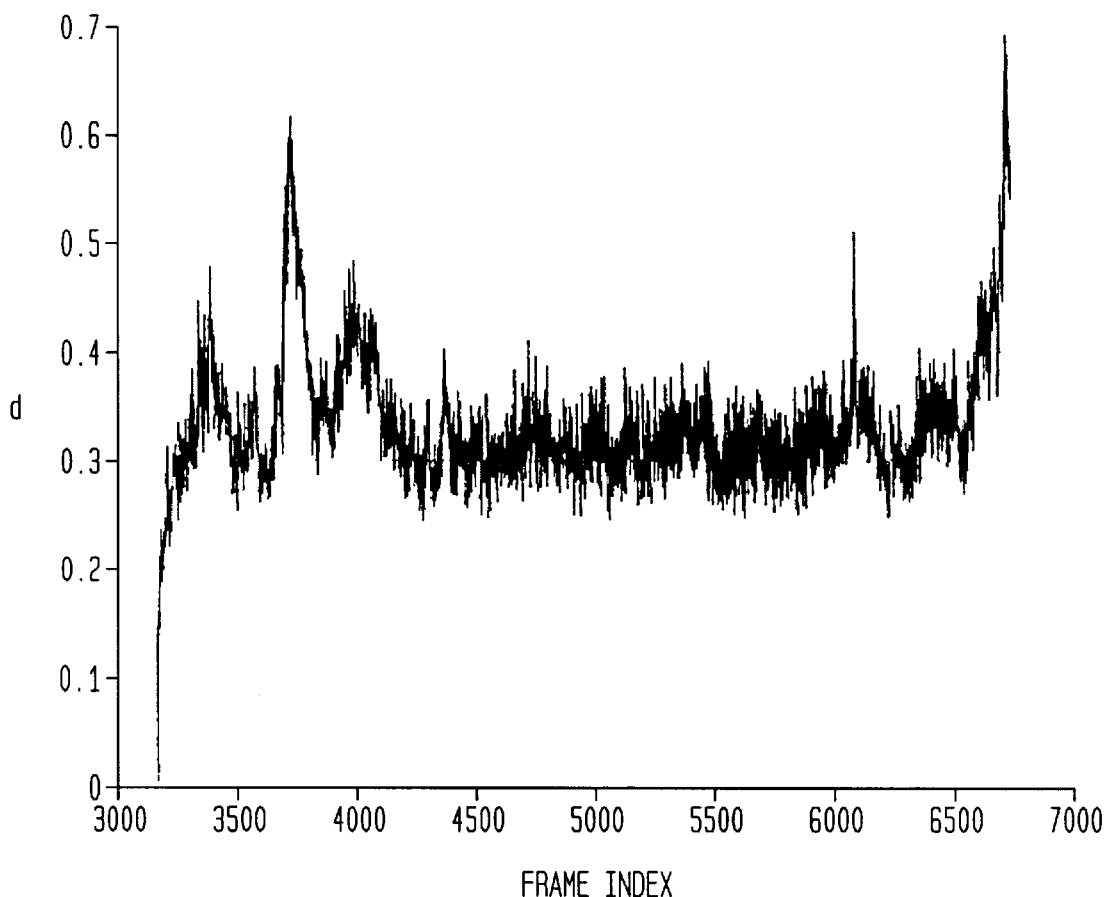
FIG. 7 illustrates a measure of the performance of the tracking method of the invention.
Figure 8:
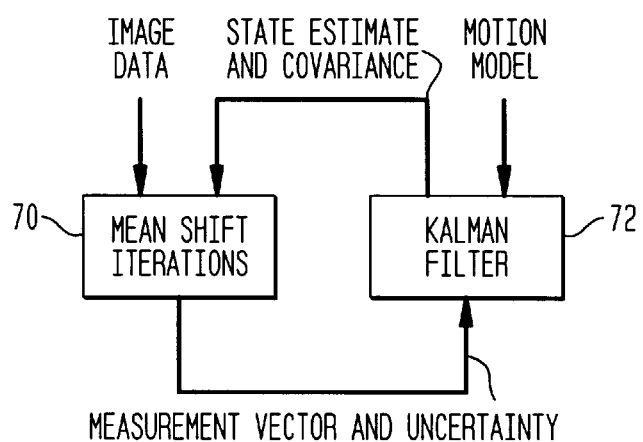
FIG. 8 illustrates in block diagram form an alternative embodiment of the invention.

The minimum value of the distance d (18) for each frame is shown in FIG. 7. The compression noise determined the distance to increase from 0 (perfect match) to a stationary value of about 0.3. Significant deviations from this value correspond to occlusions generated by other persons or rotations in depth of the target. For example, the peak of value d≈0.6 corresponds to the partial occlusion in frame 3697. The large distance increase at the end signals the complete occlusion of the target.

5. Discussion

By exploiting the spatial gradient of the statistical measure (18) the new method achieves real-time tracking performance, while effectively rejecting background clutter and partial occlusions.

Note that the same technique can be employed to derive the measurement vector for optimal prediction schemes such as the (Extended) Kalman filter, or multiple hypothesis tracking approaches. In return, the prediction can determine the priors (defining the presence of the target in a given neighborhood) assumed equal in this embodiment. This connection is the subject to our current research.

Thus, there has been shown and described a novel method and apparatus for tracking non-rigid objects. Many changes, modifications, variations and other uses and applications of the subject invention will, however, become apparent to those skilled in the art after considering this specification and its accompanying drawings, which disclose a preferred embodiment thereof For example, the object tracking can be modified by adding a prediction component to the mean shift procedure. This aspect of the invention employs the mean shift analysis to derive the measurement vector representing the location of the target candidate that is the most similar to a given target model, while prediction of the new target location is computed using an (Extended) Kalman filter. The dissimilarity between the target model (its color distribution) and the target candidates, is expressed by a metric based on the Bhattacharyya coefficient, although other dissimilarity measures can be employed.

FIG. 7 illustrates in block diagram form the main computational modules of the proposed tracking:
  fast target localization based on mean shift iterations (block 70), and
  state prediction using Kalman filtering (block 72).

In the present embodiment of the invention, the motion of the target is assumed to have a velocity that undergoes slight changes, modeled by a zero mean white noise that affects the acceleration.

In a preferred embodiment for this aspect of the invention, for fast tracking, the tracker employs two independent Kalman filters, one for each of the x and y directions. The target motion is assumed to have a slightly changing velocity modeled by a zero mean, low variance (0.01) white noise that affects the acceleration. The tracking process consists of running for each frame the mean shift based optimization which determines the measurement vector (i.e., a $y_1$) and its uncertainty, followed by a Kalman iteration which gives the predicted location of the target and a confidence region. These entities (the predicted location of the target and the confidence region) are then used to initialize the mean shift optimization for the next frame.

All such changes, modifications, variations and other uses and applications which do not depart from the teachings herein are deemed to be covered by this patent, which is limited only by the claims which follow as interpreted in light of the foregoing description.

APPENDIX

Proof of Theorem 1

Since n is finite the sequence $f_K$ is bounded, therefore, it is sufficient to show that $f_K$ is strictly monotonic increasing, i.e., if $y_j \neq y_{j+1}$ then $f_K(j) < f_K(j+1)$, for all $j=1,2 \ldots$ By assuming without loss of generality that $y_j=0$ we can write $$\hat{f}_K(j+1) - \hat{f}_K(j) = \frac{1}{nh^d} \sum_{i=1}^{n} \left[ k\left(\left\|\frac{y_{j+1}-x_i}{h}\right\|^2\right) - k\left(\left\|\frac{x_i}{h}\right\|^2\right) \right] \quad (A.1)$$

The convexity of the profile k implies that $$k(x_2) \geq k(x_1) + k'(x_1)(x_2-x_1) \quad (A.2)$$

for all $x_1, x_2 \in [0, \infty)$, $x_1 \neq x_2$, and since $k' = -g$, the inequality (A.2) becomes $$k(x_2) - k(x_1) \geq g(x_1)(x_1-x_2) \quad (A.3)$$

Using now (A.1) and (A.3) we obtain $$\hat{f}_K(j+1) - \hat{f}_K(j) \geq \frac{1}{nh^{d+2}} \sum_{i=1}^{n} g\left(\left\|\frac{x_i}{h}\right\|^2\right)[\|x_i\|^2 - \|y_{j+1}-x_i\|^2] \geq \quad (A.4)$$

$$\frac{1}{nh^{d+2}} \sum_{i=1}^{n} g\left(\left\|\frac{x_i}{h}\right\|^2\right)[2 y_{j+1}^T x_i - \|y_{j+1}\|^2] =$$

$$\frac{1}{nh^{d+2}} * \left[ 2 y_{j+1}^T \sum_{i=1}^{n} x_i g\left(\left\|\frac{x_i}{h}\right\|^2\right) - \|y_{j+1}\|^2 \sum_{i=1}^{n} g\left(\left\|\frac{x_i}{h}\right\|^2\right) \right]$$

and by employing (14) it results that $$\hat{f}_K(j+1) - \hat{f}_K(j) \geq \frac{1}{nh^{d+2}} \|y_{j+1}\|^2 \sum_{i=1}^{n} g\left(\left\|\frac{x_i}{h}\right\|^2\right) \quad (A.5)$$

Since k is monotonic decreasing we have $-k'(x) \equiv g(x) \geq 0$ for all $x \in [0, \infty)$. The sum $$\sum_{i=1}^{n} g\left(\left\|\frac{x_i}{h}\right\|^2\right)$$

is strictly positive, since it was assumed to be nonzero in the definition of the mean shift vector (10). Thus, as long as $y_{j+1} \neq y_j = 0$, the right term of (A.5) is strictly positive, i.e., $f_K(j+1) - f_K(j) > 0$. Consequently, the sequence $f_K$ is convergent.

To prove the convergence of the sequence $\{y_j\} j = 1, 2 \ldots$ we rewrite (A.5) but without assuming that $y_j = 0$. After some algebra we have $$\hat{f}_K(j+1) - \hat{f}_K(j) \geq \frac{1}{nh^{d+2}} \|y_{j+1}-y_j\|^2 \sum_{i=1}^{n} g\left(\left\|\frac{y_j-x_i}{h}\right\|^2\right) \quad (A.6)$$

Since $f_K(j+1) - f_K(j)$ converges to zero, (A.6) implies that $\|y_{j+1}-y_j\|$ also converges to zero, i.e., $\{y_j\}_{j=1,2 \ldots}$ is a Cauchy sequence. This completes the proof, since any Cauchy sequence is convergent in the Euclidean space.

Proof That the Distance $d(\hat{p},\hat{q}) = \sqrt{1-\rho(\hat{p},\hat{q})}$ is a Metric The proof is based on the properties of the Bhattacharyya coefficient (17). According to the Jensen's inequality [described at page 25 of T. M. Cover and J. A. Thomas, Elements of Information Theory, John Wiley & Sons, New York, 1991] we have $$\rho(\hat{p},\hat{q}) = \sum_{u=1}^{m} \sqrt{\hat{p}_u \hat{q}_u} = \sum_{u=1}^{m} \hat{p}_u \sqrt{\frac{\hat{q}_u}{\hat{p}_u}} \leq \sqrt{\sum_{u=1}^{m} \hat{q}_u} = 1 \quad (A.7)$$

with equality if p=q. Therefore, $d(\hat{p},\hat{q}) = \sqrt{1-\rho(\hat{p},\hat{q})}$ exists for all discrete distributions p and q, is positive, symmetric, and is equal to zero if p=q.

The triangle inequality can be proven as follows. Let us consider the discrete distributions p, q, and r, and define the associated m-dimensional points $\xi_p = (\sqrt{\hat{p}_1}, \ldots, \sqrt{\hat{p}_m})^T$, $\xi_q = (\sqrt{\hat{q}_1}, \ldots, \sqrt{\hat{q}_m})^T$, and $\xi_r = (\sqrt{\hat{r}_1}, \ldots, \sqrt{\hat{r}_m})^T$ on the unit hypersphere, centered at the origin. By taking into account the geometric interpretation of the Bhattacharyya coefficient, the triangle inequality $$d(\hat{p},\hat{r}) + d(\hat{q},\hat{r}) \geq d(\hat{p},\hat{q}) \quad (A.8)$$

is equivalent to $$\sqrt{1-\cos(\xi_p,\xi_r)} + \sqrt{1-\cos(\xi_q,\xi_r)} \geq \sqrt{1-\cos(\xi_p,\xi_q)} \quad (A.9)$$

If we fix the points $\xi_p$ and $\xi_q$, and the angle between $\xi_p$ and $\xi_r$, the left side of inequality (A.9) is minimized when the vectors $\xi_p$, $\xi_q$ and $\xi_r$ lie in the same plane. Thus, the inequality (A.9) can be reduced to a 2-dimensional problem that can be easily demonstrated by employing the half-angle sinus formula and a few trigonometric manipulations.

What is claimed is:

1. A method for real-time tracking of a target which appears in a plurality of successive image frames, comprising the following steps:
   a) Identifying a given target in a given frame of a sequence of frames, said given target having a center in said given frame at a location $y_0$,
   b) Developing a characterization of the given target,
   c) Developing a characterization of a candidate target in a successive frame of the sequence of frames, the candidate target initially being centered at the location $y_0$ in the successive frame,
   d) Computing a Bhattacharyya coefficient ($\rho$) as a measure of similarity between the given target centered at the location $y_0$ in the given frame and the candidate target centered at the location $y_0$ in the successive frame, using the given and candidate target characterizations,
   e) Deriving a new location $y_1$ for the candidate target in the successive frame by computing a gradient vector which corresponds to a maximization of the Bhattacharyya coefficient in the area of $y_0$,
   f) Re-computing the Bhattacharyya coefficient ($\rho$) as a measure of similarity between the given target centered at the location $y_0$ in the given frame and the new candidate target centered at the new location $y_1$ in the successive frame,
   g) Comparing the result of step d) with the result in step f), and when the result in step f) is less than the result in step d), determining a new location $y_1'$ along the line determined by $y_0$ and $y_1$, and then repeating step f), but where $y_1$ is replaced with $y_1'$, until the result in step f) is equal or greater than the result in step d), and
   h) Determining if $y_1'$ is within a threshold value of $y_0$, and if it is, then that $y_1'$ corresponds to the location of the best target candidate, and if $y_1'$ is not within a threshold value of $y_0$, assigning $y_1'$ to $y_0$ and repeating steps d) through g) until it is.

2. The method of claim 1, wherein said step g) determines the new location $y_1'$ as the arithmetic mean of locations $y_0$ and $y_1$.

3. The method of claim 1, wherein said steps b) and c) characterize each target as a probability distribution of a feature of the target.

4. The method of claim 3, wherein the feature is selected from the group of color or texture of the target.

5. The method of claim 1, wherein the characterization of each target is expressed as a histogram.

6. The method of claim 1, wherein said step e) uses a mean shift iteration to compute the gradient vector.

7. The method of claim 1, further comprising generating said successive frames using a moving camera.

8. The method of claim 7, including the further step of using the location of said best target candidate to develop a tracking signal for controlling the movement of said camera.

9. The method of claim 8, wherein said tracking signal is applied to said camera in a manner intended to keep said given target within a field of view of the camera.

10. The method of claim 9, wherein said tracking signal is applied to said camera so as to control one or more of its pan, tilt, and zoom functions.

11. A method for real-time tracking of a target which appears in a plurality of successive frames, comprising:
  a) Developing a statistical distribution as a characterization of a visual feature of each of a given target in a first frame and a candidate target in a successive frame,
  b) Computing a degree of similarity between the statistical distribution of the given target and the statistical distribution of the candidate target, and
  c) Applying an iterative comparative procedure to the degrees of similarity computed in step b), the iterations being based on a gradient vector corresponding to a maximization of the degree of similarity in order to shift the location of candidate target in the successive frame, to derive as the location of the candidate target in the successive frame that location which has characteristics most similar to the characteristics of the given target wherein said iterations are repeated until said shift in locations is less than a given threshold.

12. Apparatus for real-time tracking of a target which appears in a plurality of successive image frames, comprising:
  a) a characterization processor for developing a statistical distribution as a characterization of a visual feature of each of a given target in a first frame and a candidate target in a successive frame,
  b) a Bhattacharyya coefficient ($\rho$) processor for computing a Bhattacharyya coefficient ($\rho$) as a degree of similarity between the given target and the candidate target, and
  c) a controller for applying an iterative comparative procedure to the computed degrees of similarity, the iterations being based on a gradient vector corresponding to a maximization of the degree of similarity in order to shift the location of the candidate target in the successive frame, to derive as the location of the candidate target in the successive frame that location which has characteristics most similar to the characteristics of the given target.

13. The apparatus of claim 12, wherein said controller causes said iterations to be repeated until said shift in locations is less than a given threshold.

14. The apparatus of claim 12, wherein said characterization processor develops a probability distribution of a feature of the target as a characterization of each target.

15. The apparatus of claim 14, wherein the feature is selected from the group of color or texture of the target.

16. The apparatus of claim 12, wherein said characterization processor develops a histogram as a characterization of each target.

17. The apparatus of claim 12, wherein said controller uses a mean shift iteration to compute a gradient vector along which the location of the candidate target is shifted.

18. The apparatus of claim 12, further including a movable camera for generating said successive frames.

19. The apparatus of claim 18, including a tracking processor responsive to the location of said best target candidate to develop a tracking signal for controlling movement of said camera.

20. The apparatus of claim 19, wherein said camera includes a movement control apparatus responsive to said tracking signal so as to keep said given target within a field of view of said camera.

21. The apparatus of claim 20, wherein said tracking signal is applied to said movement control apparatus so as to control one or more of pan, tilt, and zoom functions of said camera.

22. Apparatus for real-time tracking of a target which appears in a plurality of successive image frames, comprising:
  a) a source for providing a sequence of successive image frames;
  b) an image processor responsive to said successive image frames for identifying a given target in a given frame of the sequence of frames, and indicating a centered location ($y_0$) for said given target in said given frame;
  c) a characterization processor for developing a characterization of the given target centered at the centered location, and a characterization of a candidate target centered at a centered location in a successive frame of the sequence of frames;
  d) a Bhattacharyya coefficient ($\rho$) processor for computing a Bhattacharyya coefficient ($\rho$) as an initial measure of similarity between the characterization of the given target and the characterization of the candidate target at their respective centered locations;
  e) a gradient vector processor for computing a gradient vector corresponding to a maximization of the Bhattacharyya coefficient of the candidate target at the centered location in the successive frame; and
  f) a controller:
    i. responsive to said gradient vector for deriving a new centered location ($y_1$) for the candidate target in the successive frame,
    ii. for causing said Bhattacharyya coefficient ($\rho$) processor to re-compute the Bhattacharyya coefficient ($\rho$) as a new measure of similarity between the given target centered at the location ($y_0$) in the given frame and the new candidate target centered at the new location ($y_1$) in the successive frame,
    iii. for comparing the initial and new measures of similarity, and when the measures of similarity are within a threshold of each other,
    iv. determining if the further new centered location in the successive frame is within a threshold value of the centered location of the given frame, and if it is, then that further new centered location in the successive frame corresponds to the center location of the best target candidate.

23. The apparatus of claim 22, wherein when said controller determines that there is less than a given measured amount of similarity between the initial and new measures of similarity, said controller is responsive to said gradient vector processor to derive a further new centered location ($y_1'$) and then re-compute and compare the measures of similarity at the new and further new centered locations, until the measures of similarity therebetween are within a threshold of each other.

24. The apparatus of claim 23, wherein when said controller determines that the further new centered location in the successive frame is not within a threshold value of the centered location of the given frame, said controller assigns the further new centered location to the centered location previously used for said successive frame, and re-computes and compares the measures of similarity at the new and further new centered locations until it is.

25. The apparatus of claim 22, wherein said controller determines the further new location ($y_1'$) as the arithmetic mean of the initial and new locations ($y_0$ and $y_1$).

26. The apparatus of claim 22, wherein said characterization processor develops a probability distribution of a feature of the target as a characterization of each target.

27. The apparatus of claim 26, wherein the feature is selected from the group of color or texture of the target.

28. The apparatus of claim 22, wherein said characterization processor develops a histogram as a characterization of each target.

29. The apparatus of claim 22, wherein said gradient vector processor uses a mean shift iteration to compute the gradient vector.

30. The apparatus of claim 22, further including a moving camera for generating said successive frames.

31. The apparatus of claim 30, including a tracking processor responsive to the location of said best target candidate to develop a tracking signal for controlling the movement of said camera.

32. The apparatus of claim 30, wherein said camera includes a movement control apparatus responsive to said tracking signal so as to keep said given target within a field of view of said camera.

33. The apparatus of claim 32, wherein said tracking signal is applied to said movement control apparatus so as to control one or more of pan, tilt, and zoom functions.

* * * * *